(12) United States Patent
Lawall et al.

(10) Patent No.: US 7,448,665 B2
(45) Date of Patent: Nov. 11, 2008

(54) PIVOT AND STOW SEATING

(75) Inventors: Jennifer P. Lawall, Waterford, MI (US);
Diane K. McQueen, Leonard, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 87 days.

(21) Appl. No.: 11/675,111

(22) Filed: Feb. 15, 2007

(65) Prior Publication Data

US 2008/0197653 A1    Aug. 21, 2008

(51) Int. Cl.
*B60N 2/10* (2006.01)
(52) U.S. Cl. .............................. 296/65.06; 297/344.21
(58) Field of Classification Search ............... 296/65.01, 296/65.06, 65.07, 65.09; 297/344.21, 344.22, 297/344.23, 344.24, 344.25, 344.26
See application file for complete search history.

(56) References Cited

U.S. PATENT DOCUMENTS

| | | | | |
|---|---|---|---|---|
| 4,740,030 | A * | 4/1988 | Nordskog | 297/13 |
| 5,707,103 | A * | 1/1998 | Balk | 297/13 |
| 6,231,103 | B1 * | 5/2001 | Elson et al. | 296/65.06 |
| 6,886,878 | B2 * | 5/2005 | Schambre et al. | 296/65.09 |

* cited by examiner

*Primary Examiner*—Joseph D Pape

(57) ABSTRACT

A method is disclosed for stowing a bench seat or a segment of a bench seat into the floor of a vehicle. The steps include folding the backrest onto the seat base. The seat is then tilted upwards about an axis aligned with one side end of the seat to place the seat in a raised position. The raised seat is then rotated about a vertical axis until the seat is aligned for pivoting into the seat stowage compartment. The seat is then pivoted downwards into the stowage compartment.

13 Claims, 9 Drawing Sheets

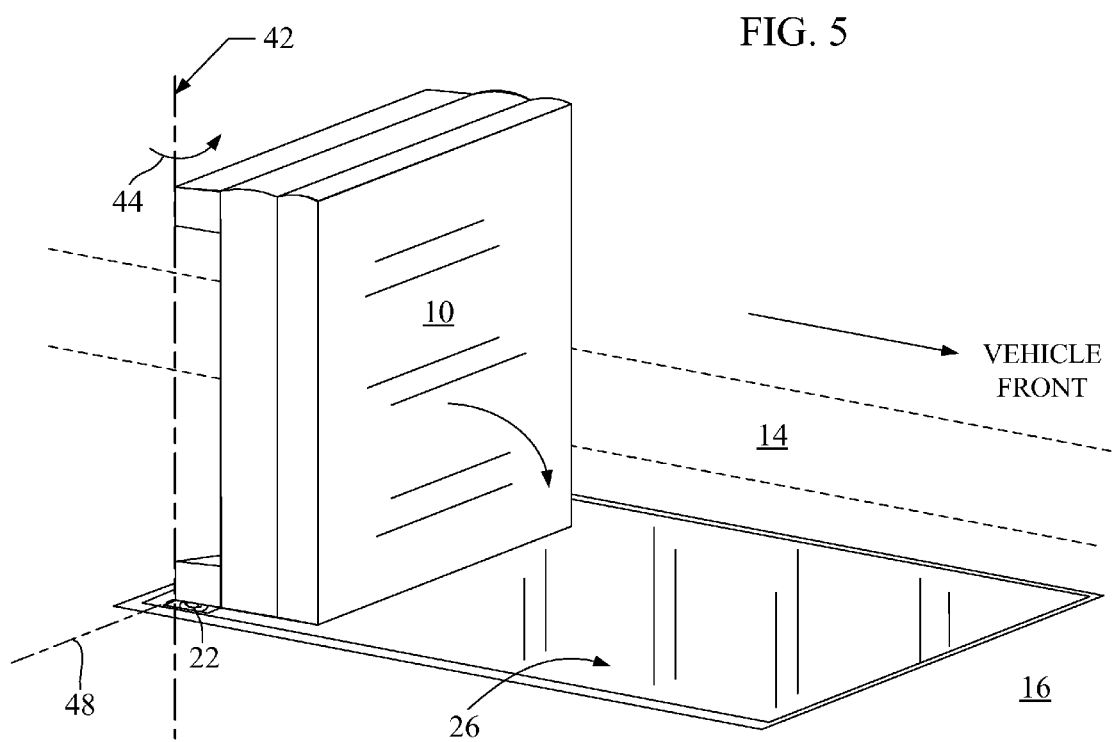

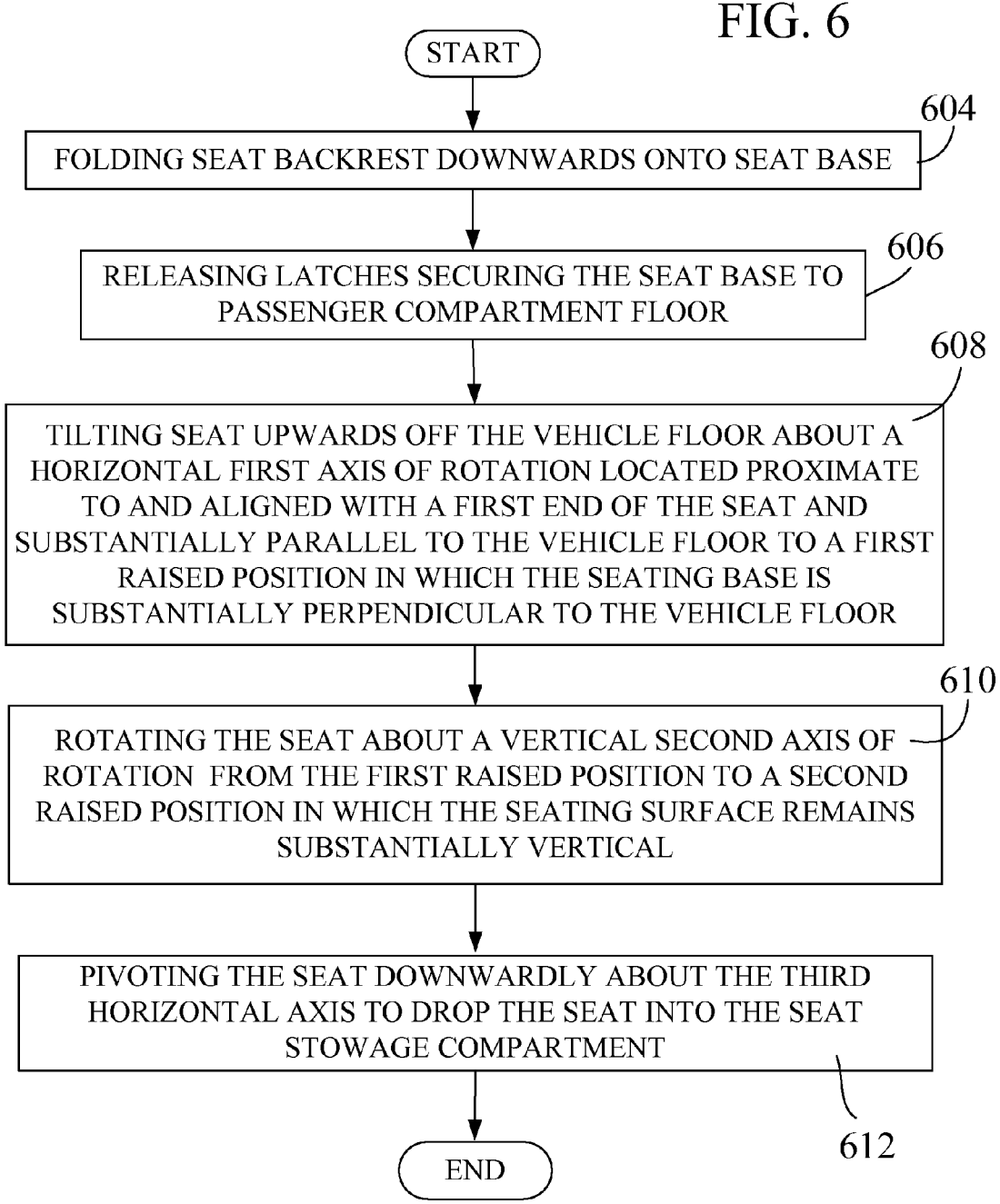

PIVOT AND STOW SEATING

TECHNICAL FIELD

This application relates to seats for vehicles, and more specifically to improvements in bench seats to allow for stowing the bench seat into the vehicle floor.

BACKGROUND OF THE INVENTION

Stowing bucket style rear seats into a tub in the floor pan of a vehicle is known in the art. The typical vehicle allows for rear bucket style seats to be individually stowed into the floor of the vehicle to increase cargo capacity within the passenger compartment of the vehicle. While it may be desirable to be able to stow bucket seats, bucket seats provide limited seating capacity due to the size and shape of the seat. In order to increase seating capacity, many vehicles include a second row of seating in the rear which generally consists of bench style seating.

However, most bench seats cannot be stowed into the floor pan of the vehicle because of the body structure of the floor pan. For example, some vehicles have a feature formed into or under the vehicle floor known as the tunnel. The tunnel is frequently present in rear wheel drive vehicles including, for example, varieties of trucks and sports utility vehicles. The tunnel provides clearance and space for the drive shaft to pass under the length of the vehicle floor allowing for the transmission of power from the engine to the rear wheels. Passenger bench seats normally extend over the tunnel, preventing the bench seat from being configured to drop down and stow into the vehicle floor.

In some circumstances, the bench seat may be split into two segments comprising, for one example, 60% and 40% of the seat. The segment of the seat constituting 40% may be stowable (as it may not extend over the tunnel), but the remaining bench seat segment may not be stowable because of the tunnel. The inability of the bench seat to completely stow away into the floor pan limits the cargo capacity of the passenger compartment of the vehicle.

SUMMARY OF THE INVENTION

A method is disclosed for stowing a bench seat or a segment of a bench seat onto or into the floor of a vehicle. The steps include folding the backrest onto the seat base and tilting the folded seat upwards lengthwise about a fore/aft axis of the vehicle to place the seat in a substantially vertical raised position. The raised seat is then rotated about a vertical axis. The seat is then pivoted downwards into the seat stowage position proximate to the vehicle floor.

Also disclosed is a pivot and stow seat segment of a one segment or multiple segment vehicle passenger seat. The seat segment is configured to fold and pivot into a stowed position proximate to a vehicle floor. The seat segment includes a seat base having a seating surface, a first end, an opposing second end and a major lengthwise axis passing through the first and second ends of the seat base. A seat backrest is pivotally coupled to the seat base with the backrest pivotable between an upright seating position and a downwardly folded position in which the seat backrest pivots into a faced confronting relationship with the seating surface. A pivot mechanism is provided for securing the seat to the passenger cabin floor while enabling the seat to be pivoted upwards on one end, pivoted about a vertical axis and folded into the stowage position. The pivot mechanism includes a first portion secured to a lower corner portion of the seat base proximate to the first end of the seat and a second portion pivotally secured to the vehicle floor. The first and second portions of the pivot mechanism are pivotally joined to permit at least two axes of rotation between the first and second portions, plus a third horizontal axis of rotation substantially parallel to the vehicle floor which in certain embodiments may derive from the pivotal mount of the second portion of the pivot mechanism to the vehicle floor. The pivot mechanism provides a horizontal first axis of rotation located proximate to the first end of the seat with the first axis perpendicular to the lengthwise axis of the seat and a second vertical axis of rotation. The pivot mechanism assists supporting and guiding the passenger seat while moving between the seating position and the stowed position. The seat base pivots on the pivot mechanism about the first axis from the seating position in which the seat base seating surface is substantially aligned with the vehicle floor to a first raised position in which the seating surface is substantially perpendicular to the vehicle floor. The seat is then rotably pivotable on the pivot mechanism about the vertical second axis from the first raised position to a second raised position in which the seating surface remains substantially perpendicular to the vehicle floor and in which the third axis is aligned for downwardly pivoting the seat towards the vehicle floor into the stowed position.

According to one aspect of the invention the vehicle seat is a bench seat.

According to another aspect of the invention the vehicle seat in the seating position spans over a portion of the tunnel of the vehicle and the stowed position is aligned along side the tunnel.

According to another aspect of the invention, the method includes releasing latches securing the seat base to the vehicle floor to permit the seat to be raised and pivoted.

According to another aspect of the invention, the stowage position is within a seat stowage compartment of the vehicle, located under the vehicle floor.

The above features and advantages and other features and advantages of the present invention are readily apparent from the following detailed description of the best modes for carrying out the invention when taken in connection with the accompanying drawings.

BRIEF DESCRIPTION OF THE DRAWINGS

The drawings show a form of the invention that is presently preferred; however, the invention is not limited to the precise arrangement shown in the drawings.

FIG. 5 illustrates a schematic perspective view from the observer position of FIG. 2 depicting the longer segment of the bench seat of FIG. 2 in which the longer segment of the seat has rotated about a second axis of rotation substantially perpendicular to the vehicle floor, rotating the seat from the first raised position of FIG. 4 to a second raised position of FIG. 5 in which the seating surface remains substantially vertical, wherein the seat is positioned to pivot downwards and drop into the stowage compartment in the vehicle floor in accordance with the present invention;

FIG. 6 illustrates a method of stowing a vehicle passenger seat segment in accordance with the present invention;

DESCRIPTION OF THE PREFERRED EMBODIMENTS

Figure 1:
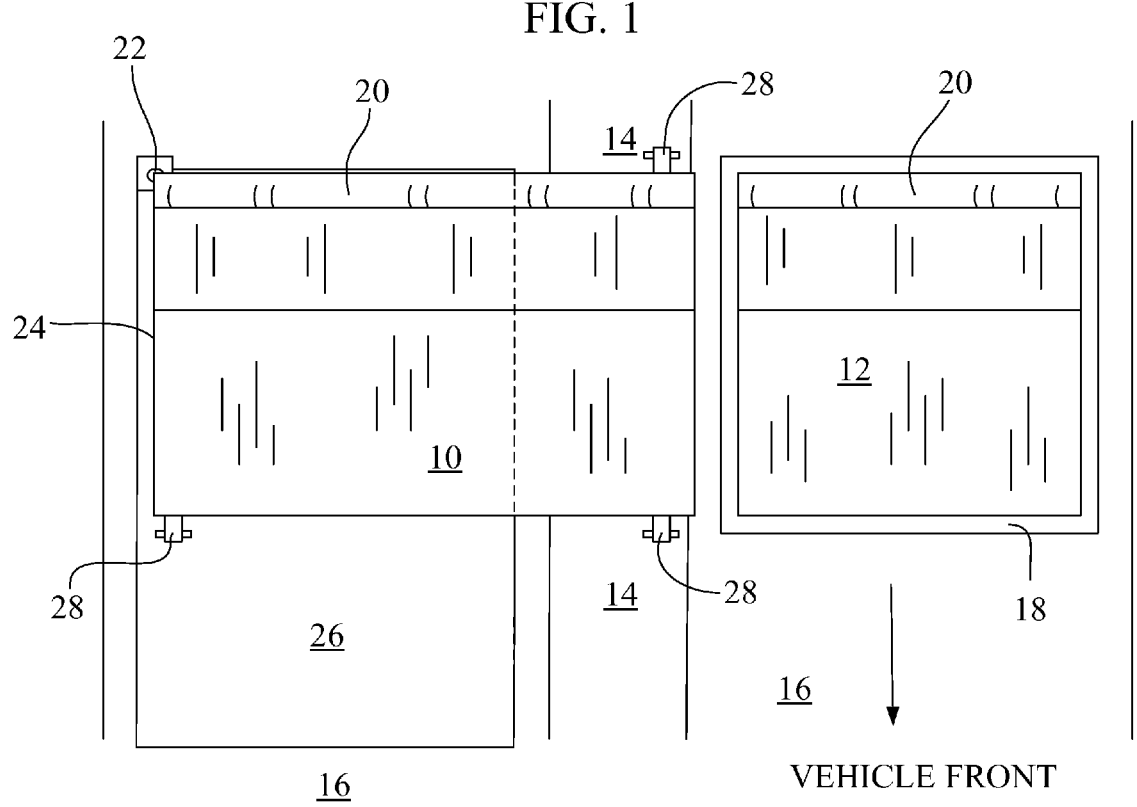
FIG. 1 illustrates a schematic top view of a passenger compartment bench style seat comprising a longer seat segment extending over a vehicle tunnel and a separate but adjoining shorter seat segment consistent with the present invention.

FIG. 1 illustrates a top view of a passenger compartment bench style seat 20 comprising a longer seat segment 10 extending over a vehicle tunnel 14 and a separate but adjoining shorter seat segment 12 consistent with the present invention. While two seat segments are illustrated in FIG. 1, it is to be understood that the bench style seat may consist of any number of segments including just one segment. Each segment 10, 12 may be able to fold independently of each other. The larger segment 10 may comprise sixty or seventy percent of the combined bench seat 20, while the smaller segment 12 may comprise the remaining forty or thirty percent of the bench seat 20. However, it can be appreciated that the bench seat may include any number of segments, with each segment constituting any percentage of the whole bench seat. The shorter seat segment 12 of the passenger seat 20 is suited for stowing into compartment 18 in the vehicle floor 16 using conventional techniques. Of particular interest in this disclosure is the longer and more problematic passenger seat segment 10. Passenger seat segment 10, as it spans across a vehicle tunnel 14, is not amenable for dropping down to stow into a stowage compartment in the vehicle floor 16 due to the interference from the vehicle tunnel 14. The tunnel 14 prevents the provision of a stowage compartment directly under the longer seat segment 10. To solve this issue and permit the longer segment 10 of the seat to stow, a pivot mechanism 22 (shown only schematically) is provided having a first portion secured to a lower corner portion of the first end 24 of the seat segment 10 and a second portion of the pivot mechanism secured to the vehicle floor 16. The first and second portions of the pivot mechanism are pivotally joined to permit at least two axes of rotation between the first and second portions. The longer seat segment 10 has releasable latches 28 on the remaining three corners of the seat base of segment 10 for releasably locking the seat to the vehicle floor 16. The latches 28 are only illustrated schematically in the figures but the latches can be any variety of releasable latches for securing stowable or removable vehicle seats to the vehicle floor as would be known to those skilled in the art. The first end 24 of the seat segment 10 is the end of the seat located furthest from the tunnel 14. The seat segment 10 will pivot upon the pivot mechanism 22 to tilt upwards by approximately 90 degrees, rotate about the pivot mechanism 22 to bring the seat into alignment with the seat stowage compartment 26, then pivot downwardly into the seat stowage compartment 26 to stow the seat into the vehicle floor 16.

Figure 2:
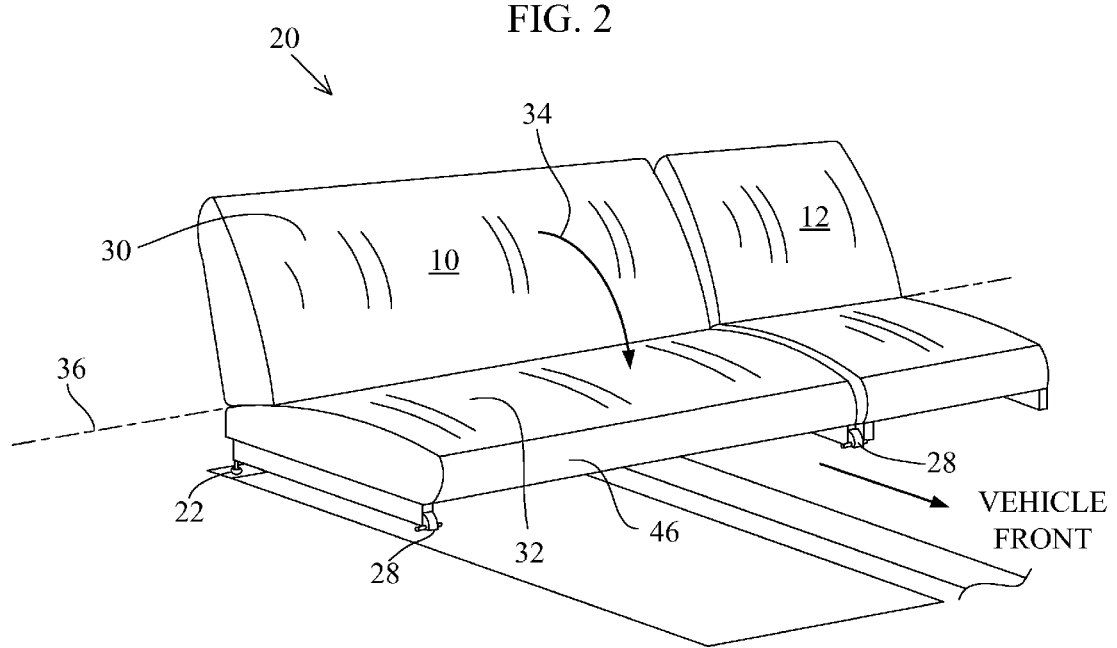
FIG. 2 illustrates a schematic perspective view from a front corner of the longer bench style seat segment and adjoining shorter bench style seat segment of FIG. 1 consistent with the present invention.
Figure 3:
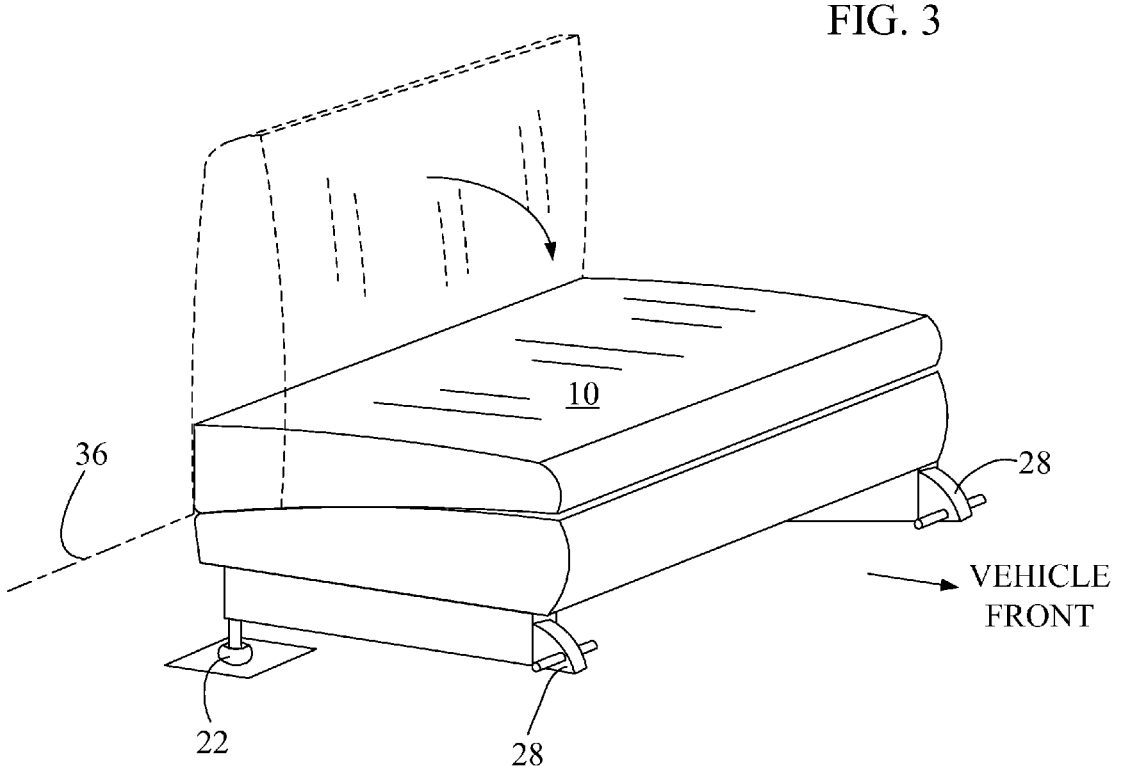
FIG. 3 illustrates a schematic perspective view from the observer position of FIG. 2 of the longer bench style seat with the seat backrest folded downwards onto the seating surface of the seat base in preparation for stowing the seat floor in accordance with the present invention.

FIG. 2 illustrates a perspective view from a front corner of the longer bench style seat segment 10 and adjoining shorter bench style seat segment 12 of FIG. 1 consistent with the present invention. In preparation for stowing the vehicle bench seat segment seat 10, the seat backrest 30 is folded downwardly 34 about a backrest hinge axis 36 from an upright position onto the seating surface 32 of seat base 46, placing the seat backrest 30 and the seating surface 32 in a folded confronting relationship as depicted in FIG. 3. In FIG. 3 the shorter segment 12 of the bench seat is not illustrated as discussion is now directed to stowing the longer seat segment 10 in accordance with the present invention. The releasable latches 28 on the seat base are then disengaged from the vehicle floor 16.

Figure 4:
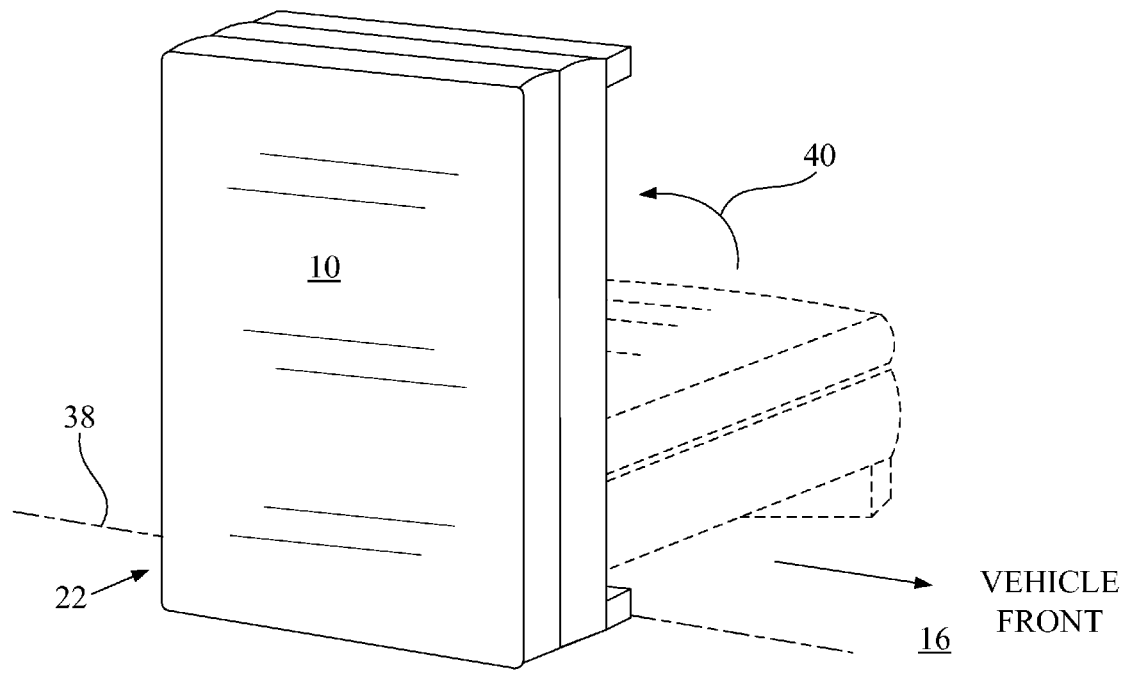
FIG. 4 illustrates a schematic perspective view from the observer position of FIG. 2 depicting the longer segment of the bench seat of FIG. 2 in which the longer segment of the seat has rotated upwards about a horizontal first axis of rotation of the pivot mechanism to place the seat in a first raised position in which the seating surface is substantially perpendicular to the vehicle floor in accordance with the present invention.

FIG. 4 illustrates a perspective view from the observer position of FIG. 2 depicting the longer seat segment 10 which has rotated upwards 40 by approximately ninety degrees about a horizontal first axis of rotation 38 of the pivot mechanism 22 to place the seat in a first raised position in which the seating surface is substantially perpendicular to the vehicle floor 16 in accordance with the present invention. The pivot mechanism is only illustrated schematically in the figures but it could be a ball/socket configuration, U-joint configuration, or other suitable device allowing the required rotations. Detents may be provided for supporting the seat in the various pivot positions.

FIG. 5 illustrates a perspective view from the observer position of FIG. 2 depicting the longer segment 10 of the bench seat of FIG. 2 in which the longer segment 10 of the seat has rotated about a second axis of rotation 42 substantially perpendicular to the vehicle floor 16, rotating the seat from the first raised position of FIG. 4 to a second raised position of FIG. 5 in which the seating surface remains substantially perpendicular to the vehicle floor (i.e., vertical) and in which the seat segment 10 is rotated 44 into a facing relationship with the seat stowage compartment 26. The seat is positioned to pivot downwards about a third horizontal axis 48 to drop into the seat stowage compartment 26 in the vehicle floor 16 without interfering with the tunnel 14, in accordance with the present invention. By pivoting the seat about pivot mechanism 22 as described herein and illustrated in FIGS. 1-5, the vehicle seat segment which spans over a tunnel 14 in a seating position is permitted to stow below the vehicle floor 16, thereby solving a problem in the current seat stowing methods which do not permit a seat positioned over the tunnel area of the vehicle floor 16 to stow into the floor.

In certain embodiments the seat segment 10 may stow onto the passenger floor 16 along side the tunnel 14 rather than into a stowage compartment 26 under the vehicle floor. In either case the seat segment 10 is stored at a lower elevation, permitting more cargo space than would otherwise be provided.

FIG. 6 illustrates a method of stowing a vehicle passenger seat segment in accordance with the present invention. As noted earlier, a vehicle passenger seat may consist of any number of segments including just one segment. The method begins at block 604 by folding the seat backrest downwards onto the seating surface of the seat base, thereby collapsing the seat into a more compact form for stowing. At block 606 releasable latches that secure the seat base to the passenger cabin floor are released so that the seat releases from the floor and can be pivoted as described below. At block 608 the seat base is tilted upwards off the vehicle floor by pivoting the seat base about a horizontal first axis of rotation located proximate to and aligned with a first end of the seat and substantially parallel to the vehicle floor. The seat is tilted about the first axis from a seating position in which the seat base is substantially aligned with the vehicle floor to a first raised position in which the seating base is substantially perpendicular to the vehicle floor. Then at block 610 the seat base is rotated about a second axis of rotation from the first raised position to a second raised position in which the seating surface remains substantially vertical and in which the seat is aligned for pivoting downwards into the stowage position. The method concludes at step 612 by pivoting the seat downwardly about a third horizontal axis to drop the seat into the seat stowage compartment in the vehicle floor.

Figure 7A:
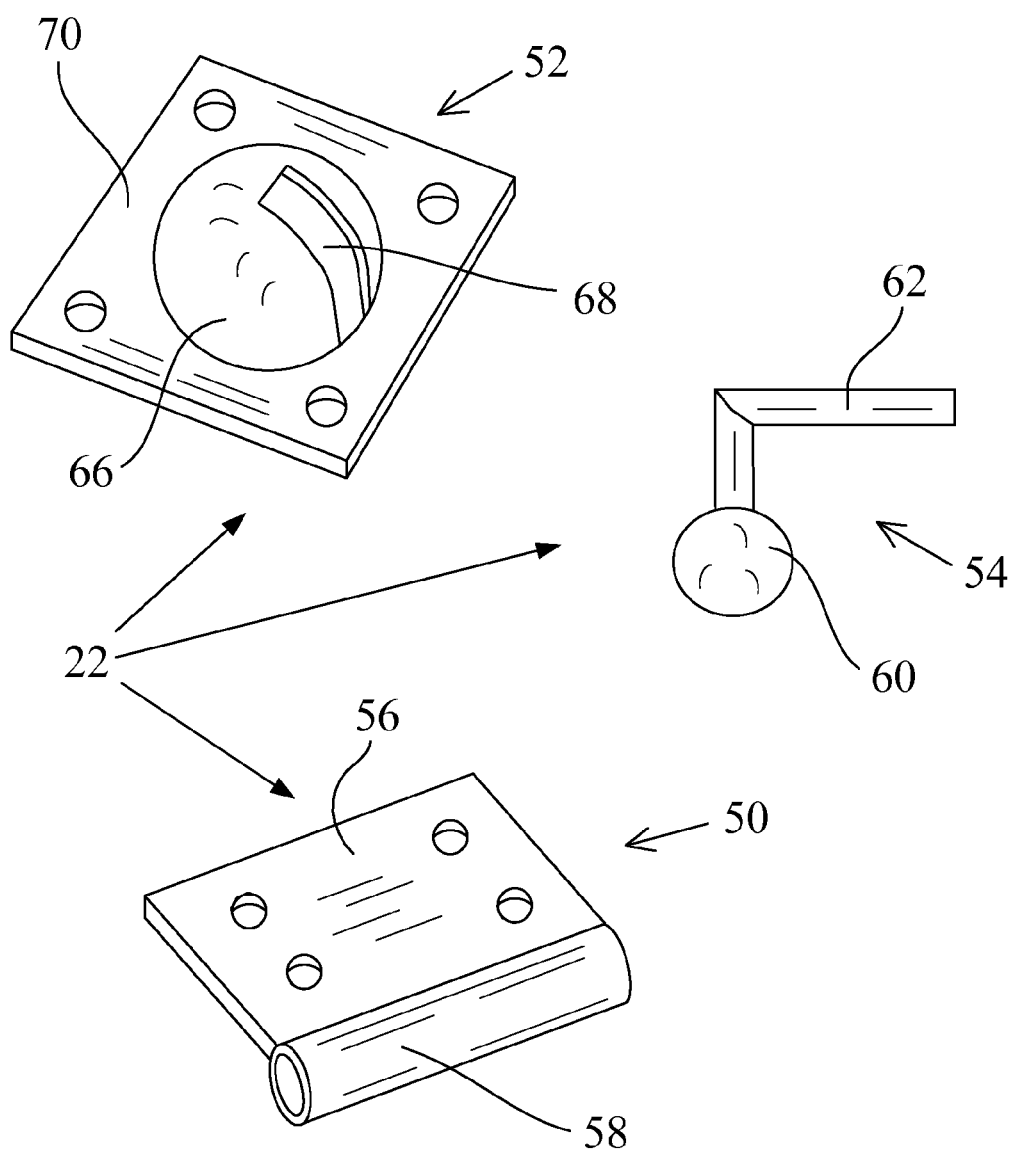
FIG. 7A illustrates an exploded perspective view of the components of one exemplary pivot mechanism.

FIG. 7A illustrates an exploded perspective view of the components of the exemplary pivot mechanism 22. This illustrated embodiment is provided exclusively as an aid to understanding the relationships between pivot axes, how they may be embodied into a single pivot mechanism and how they relate to supporting and guiding the passenger seat segment in moving between the folded seating position and the stowed position into the vehicle floor. The illustrated embodiment is not intended to be limiting in any way as other embodiments of the pivot mechanism will be readily apparent to those skilled in the art upon reading the disclosure and review of the Figures presented. The first portion 50 of the pivot mechanism 22 has a mounting flange 56 for securing to the lower corner of the seat base of the seat segment. A first swivel member 58 is secured to the mounting flange 56 of the first portion 50. The pivotable joining member 54 comprises an L-shaped second swivel member 62 secured to a spherical ball 60. The second swivel member 62 is sized and adapted to be received into the bore of the first swivel member 58 So that the first portion 50 and the pivotable joining member 54 are swively joined. The second portion 52 of the swivel member comprises a mounting flange 70 adapted for securing the pivot member 22 to the vehicle floor. A ball socket 68 is secured to the mounting flange 70. The ball socket 66 is sized and adapted to rotably receive the spherical ball 60 within the socket 66 such that the pivotable joining member 54 is pivotally joined to the second portion 52 of the pivot mechanism 22.

Figure 7B:
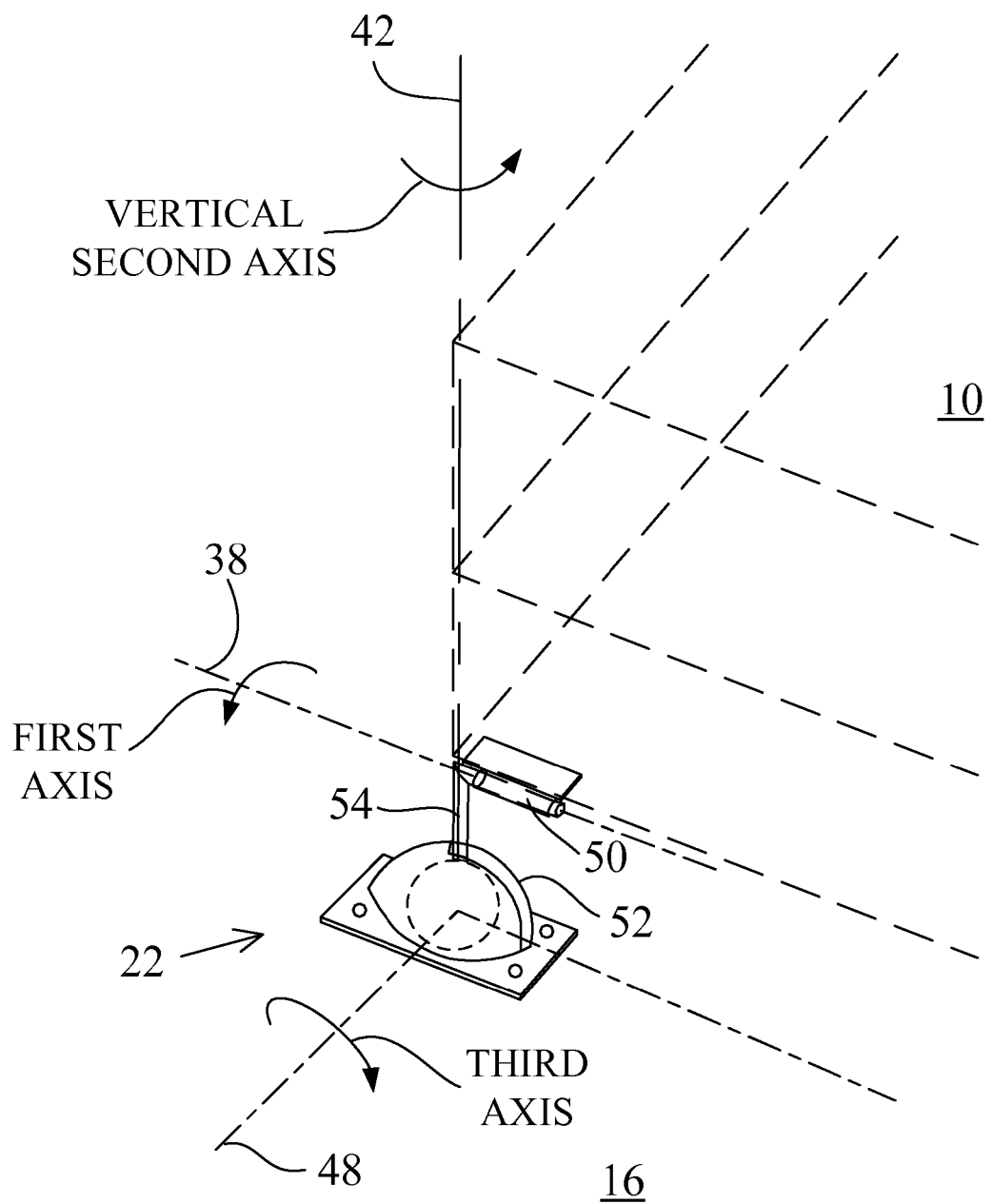
FIG. 7B illustrates a perspective view of the pivot mechanism pivotally securing the seat segment (shown schematically) to the vehicle floor with the seat segment schematically depicted in the folded seating position. The first, second and third axes of rotation provided by the pivot mechanism are identified.

FIG. 7B illustrates a perspective view of the pivot mechanism 22 pivotally securing the lower corner of the seat base of the seat segment 10 (shown schematically) to the vehicle floor 16 with the seat segment 10 in the folded seating position. The first axis 38, second axis 42 and third axis 48 of rotation provided by the pivot mechanism 22 are illustrated. With the seat segment in the folded seating position the releasable seat latches 28 (shown in FIG. 2) securing the seat segment 10 to the floor are released. With the seat segment 10 released, the seat is then free to tilt upwards off the vehicle floor 16 about the first axis 38 of the pivot mechanism 22 to place the seat segment in the first raised position. With the seat segment 10 in the first raised position, the seat is then pivoted about the vertical second axis 42 of the pivot mechanism 22 by approximately 90 degrees (counter-clockwise when viewed from above in the non-limiting specific illustrated case) to a second raised position in which the seat segment 10 remains substantially vertical and is now aligned to drop into the seat stowage compartment 26 shown in FIG. 1.

Figure 7C:
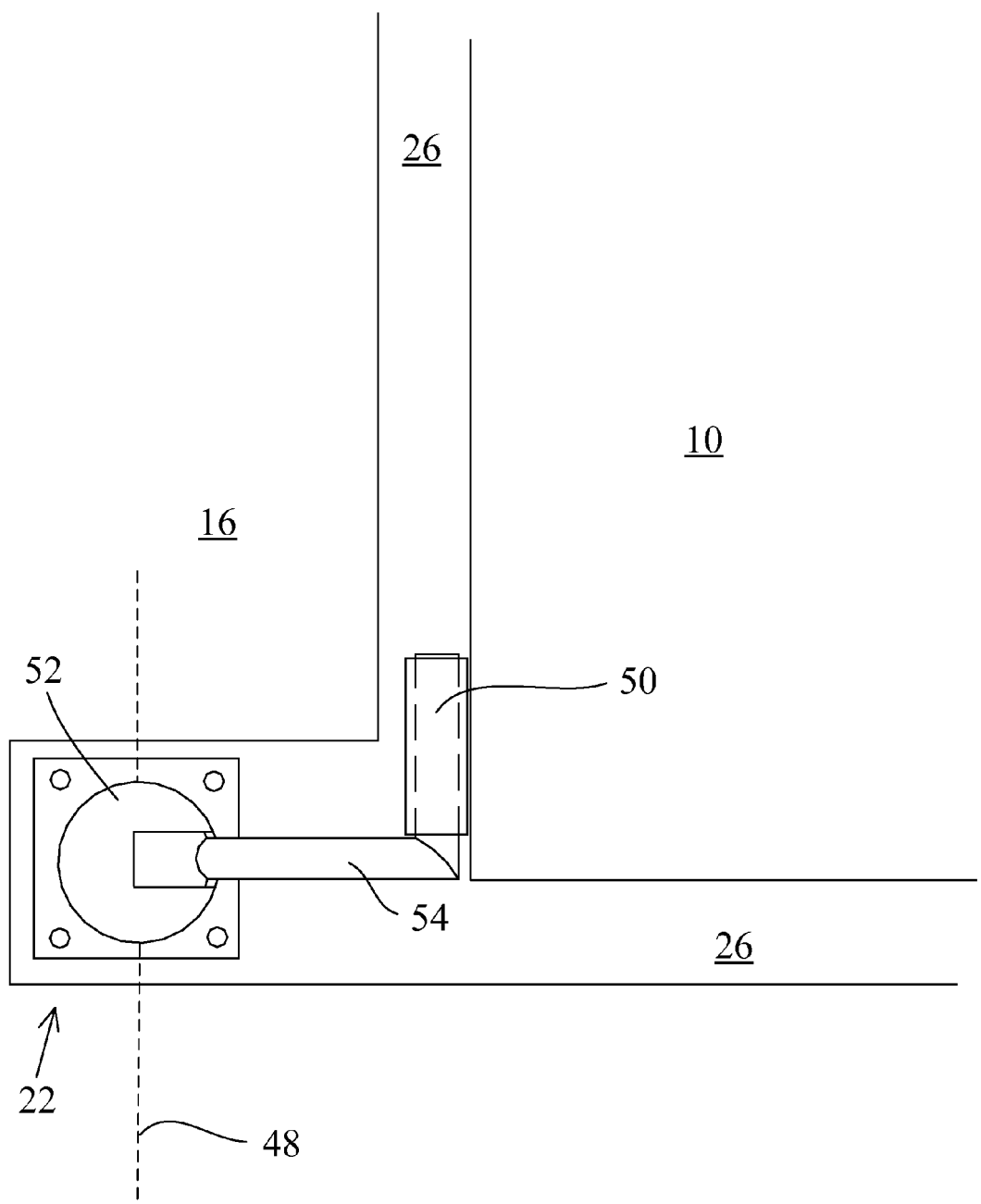
FIG. 7C is a top view depicting the pivot mechanism with the seat segment pivoted and stowed into the vehicle floor in accordance with the present invention.

FIG. 7C is a top view depicting the pivot mechanism 22 with the seat segment 10 pivoted and stowed into the stowage compartment 26 in the vehicle floor 16. From the second raised position the vehicle seat segment 10 is pivoted downwards into the seat stowage compartment 26 about the third axis 48 of the pivot mechanism 22. The seat segment 10 is then in the stowed position as illustrated in FIG. 7C.

In this paragraph the discussion now turns to an alternate embodiment of the seat pivot mechanism. In the alternate embodiment of the seat pivot mechanism (not illustrated), the pivot mechanism pivotally supports the seat base upon and above the vehicle floor and is configured to allow pivotal movement of the seat about a vertical axis substantially perpendicular to the floor. In this alternate embodiment, the pivot mechanism equips the vehicle seat to be rotated from a vehicle seating position to another rotated position in which it faces, for example, a vehicle side access door thereby providing improved passenger entrance and egress. In this alternate embodiment the pivot mechanism may be secured to any portion of the seat base including but not limited to attachment points where the seat is normally attached to the vehicle floor. In this alternate embodiment of the pivot mechanism, the pivot mechanism may be secured to the seat base at any location desired where the location is chosen according to the desired axis of rotation of the seat, for example, a location near the middle of the seat base.

While the best modes for carrying out the invention have been described in detail, those familiar with the art to which this invention relates will recognize various alternative designs and embodiments for practicing the invention within the scope of the appended claims.

The invention claimed is:

1. A pivot and stow seat segment of a vehicle passenger seat, the seat segment configured to fold and pivot into a stowed position proximate to a vehicle floor, the seat segment comprising:
   a seat base;
   a seat backrest pivotally coupled to said seat base, the backrest pivotable between an upright seating position and a downwardly folded position; and
   a pivot mechanism supporting the seat base and configured to allow pivotal movement about a first, second and third axis,
   wherein the seat segment is pivotable on the pivot mechanism about the first axis from a seating position in which the seat base is substantially aligned with the vehicle floor to a first raised position in which the seat base is substantially perpendicular to the vehicle floor, wherein the seat segment is then rotatably pivotable on the pivot mechanism about the second axis from the first raised position to a second raised position in which the seat base remains substantially perpendicular to the vehicle floor and in which the seat segment is aligned for downwardly pivoting about the third axis to drop the seat segment into the stowed position.

2. The pivot and stow vehicle passenger seat segment of claim 1, wherein the passenger seat is a bench seat.

3. The pivot and stow vehicle passenger seat segment of claim 1, wherein the passenger seat has one seat segment.

4. The pivot and stow vehicle passenger seat segment of claim 1, wherein the passenger seat has at least two seat segments.

5. The pivot and stow vehicle passenger seat segment of claim 1, wherein
   the seat segment in the seating position spans over a portion of a tunnel of the vehicle; and
   the stowed position is aligned proximate to the tunnel.

6. A pivot and stow vehicle passenger seat segment configured to fold and pivot into a stowage compartment formed in a vehicle floor, the seat segment comprising:
   a seat base;
   a seat backrest pivotally coupled to said seat base, the backrest pivotable between an upright seating position and a downwardly folded position; and a pivot mechanism adapted to support pivotal movement of the seat segment about:
  a horizontal first axis of rotation located proximate to an end of the seat segment, the first axis perpendicular to a lengthwise axis;
  a vertical second axis of rotation substantially perpendicular to the vehicle floor; and
  a third horizontal axis of rotation located proximate to said end of the seat segment, parallel to the vehicle floor and substantially perpendicular to the lengthwise axis,
  wherein the seat segment is pivotable on the pivot mechanism about the first axis from a seating position in which the seating surface is substantially aligned with the vehicle floor to a first raised position in which the seating surface is substantially perpendicular to the vehicle floor, wherein the seat segment is then rotatably pivotable on the pivot mechanism about the vertical second axis from the first raised position to a second raised position in which the seating surface remains substantially perpendicular to the vehicle floor and in which the third axis is aligned for downwardly pivoting the seat segment into the stowage compartment in the vehicle floor.

7. The pivot and stow seat segment of claim 6, wherein the seat segment is a bench seat segment.

8. The pivot and stow vehicle passenger seat segment of claim 6, wherein
  the vehicle seat segment in the seating position spans over a portion of a tunnel of the vehicle; and
  the stowed position is aligned proximate to the tunnel.

9. A method of stowing a vehicle passenger seat segment, comprising the steps of:
  folding a seat backrest downwards onto a seat base to form a folded seat segment;
  tilting the folded seat segment upwards to a first vertical position;
  rotating the folded seat segment to a second vertical position; and
  pivoting the folded seat segment downwardly into a seat stowage position.

10. The method of claim 9, wherein after the folding step the method further comprises:
  releasing latches securing the seat base to the vehicle floor.

11. The method of claim 9, wherein the stowage position is within a seat stowage compartment of the vehicle located under the vehicle floor.

12. The method of claim 11, wherein the seat stowage compartment is located beside a vehicle tunnel.

13. The method as recited in claim 9, wherein
  the step of tilting the folded seat segment includes tilting the seat segment upwards off a vehicle floor about a horizontal first axis of rotation located proximate to and aligned with a first end of the seat segment and substantially parallel to the vehicle floor, the seat segment tilting from a seating position in which the seat base is substantially aligned with the vehicle floor to a first raised position in which the seat base is substantially perpendicular to the vehicle floor; and wherein
  the step of rotating the folded seat segment includes rotating the seat base about a second axis of rotation substantially perpendicular to the vehicle floor from the first raised position to a second raised position in which the seat base surface remains substantially perpendicular to the vehicle floor and in which the seat segment is positioned for downwardly pivoting into a seat stowage position.

* * * * *